US009442823B2

(12) United States Patent
Bates et al.

(10) Patent No.: US 9,442,823 B2
(45) Date of Patent: *Sep. 13, 2016

(54) MEMORY ERROR TRACKING IN A MULTIPLE-USER DEVELOPMENT ENVIRONMENT

(71) Applicant: International Business Machines Corporation, Armonk, NY (US)

(72) Inventors: Cary L. Bates, Rochester, MN (US); Lee N. Helgeson, Rochester, MN (US); Justin K. King, Rochester, MN (US); Michelle A. Schlicht, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 130 days.

This patent is subject to a terminal disclaimer.

(21) Appl. No.: 14/551,134

(22) Filed: Nov. 24, 2014

(65) Prior Publication Data

US 2016/0124837 A1  May 5, 2016

Related U.S. Application Data

(63) Continuation of application No. 14/533,290, filed on Nov. 5, 2014.

(51) Int. Cl.
*G06F 9/44* (2006.01)
*G06F 11/36* (2006.01)
*G06F 11/07* (2006.01)

(52) U.S. Cl.
CPC ............ *G06F 11/3624* (2013.01); *G06F 8/70* (2013.01); *G06F 11/079* (2013.01); *G06F 11/0721* (2013.01); *G06F 11/3688* (2013.01)

(58) Field of Classification Search
None
See application file for complete search history.

(56) References Cited

U.S. PATENT DOCUMENTS

| 5,301,327 | A | * | 4/1994 | McKeeman | ............ G06F 8/20 711/203 |
|---|---|---|---|---|---|
| 7,430,683 | B2 | | 9/2008 | Zimmer et al. | |
| 7,543,192 | B2 | | 6/2009 | Vaidyanathan et al. | |
| 8,151,143 | B2 | | 4/2012 | Li et al. | |
| 8,423,718 | B2 | | 4/2013 | Tsai et al. | |
| 2005/0273767 | A1 | | 12/2005 | Achlioptas et al. | |
| 2006/0041864 | A1 | | 2/2006 | Holloway et al. | |
| 2007/0006041 | A1 | * | 1/2007 | Brunswig | ........... G06F 11/3688 714/38.14 |
| 2010/0083048 | A1 | | 4/2010 | Calinoiu et al. | |
| 2010/0262954 | A1 | | 10/2010 | Roos | |

(Continued)

OTHER PUBLICATIONS

Bates et al., "Memory Error Tracking in a Multiple-User Development Environment," U.S. Appl. No. 14/533,290, filed Nov. 5, 2014.

(Continued)

*Primary Examiner* — Daxin Wu
(74) *Attorney, Agent, or Firm* — Feb R. Cabrasawan; Nolan M. Lawrence

(57) ABSTRACT

A method for identifying code segments and associated software developers in a software development environment is disclosed. A software development tool detects a memory error in a first code segment. The software development tool associates the memory error with a first software developer that is associated with the first code segment. The software development tool identifies a second code segment related to the first code segment. The software development tool associates the memory error with a second software developer that is associated with the second code segment.

10 Claims, 4 Drawing Sheets

(56) References Cited

U.S. PATENT DOCUMENTS

| | | |
|---|---|---|
| 2010/0287536 A1 | 11/2010 | Chung et al. |
| 2011/0035726 A1* | 2/2011 | Davies .................... G06F 8/71 |
| | | 717/110 |
| 2011/0283163 A1 | 11/2011 | Zheng |
| 2013/0080849 A1 | 3/2013 | Guo et al. |
| 2013/0086424 A1 | 4/2013 | Smiljanic et al. |
| 2013/0339799 A1 | 12/2013 | Zheng |
| 2015/0355998 A1* | 12/2015 | Kogan-Katz ......... G06F 11/366 |
| | | 717/101 |

OTHER PUBLICATIONS

IBM, "List of IBM Patents or Patent Applications Treated as Related.", Date: Nov. 24, 2014.

* cited by examiner

US 9,442,823 B2

MEMORY ERROR TRACKING IN A MULTIPLE-USER DEVELOPMENT ENVIRONMENT

BACKGROUND

The present disclosure relates to memory error tracking, and more specifically, to identifying multiple segments of code that correspond to a memory error.

In software development, memory errors are a type of error condition detected by software development tools such as a debugger, profiler, compiler, interpreter, or linker. Memory errors are often created in a first code segment but detected by a software development tool in a second code segment. This uncertainty regarding memory errors significantly slows down development of software. The uncertainty is compounded when the first code segment is created by a first software developer and the second code segment is created by a second software developer.

SUMMARY

Embodiments of the disclosure may include a method, a system, and a computer program product for identifying code segments in a software development environment. The software development environment may be associated with a plurality of software developers. A first code segment is associated with a first software developer. A software development tool may detect a memory error in the first code segment and associate the memory error with the first software developer. A second code segment is associated with a second software developer. The second code segment may be related to the first code segment. The software development tool may identify the second code segment and associate the memory error with the second software developer.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
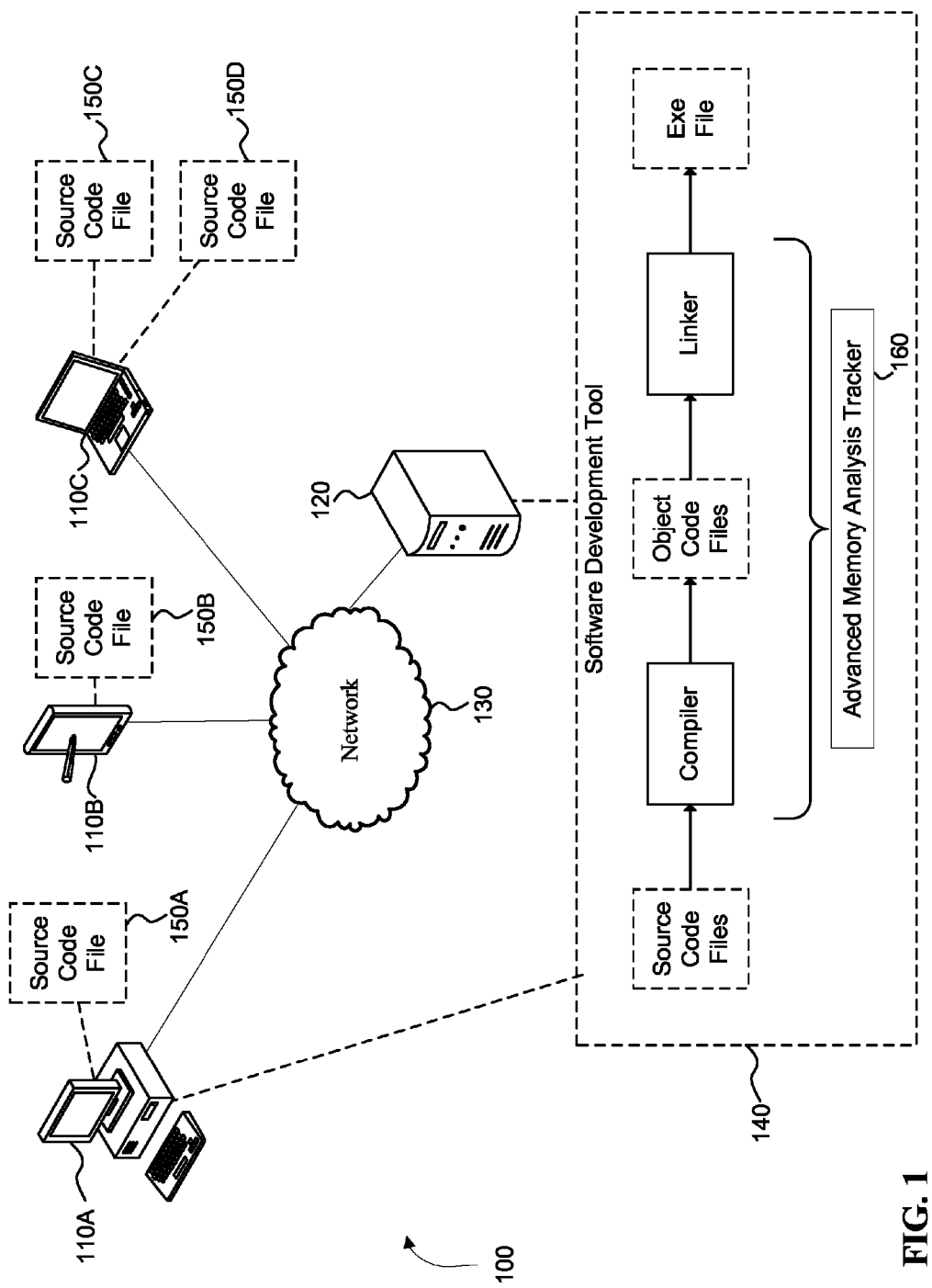
FIG. 1 depicts an example software development environment utilized in some embodiments of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer program source code analysis, and more particular aspects relate to advanced memory analysis/diagnosing and tracking to notify software developers of memory errors. While the present disclosure is not necessarily limited to such applications, various aspects of the disclosure may be appreciated through a discussion of various examples using this context.

Memory errors are an obstacle software developers must frequently overcome during development of a software program. Memory errors are errors in software code that induce a software program to read from or write to an incorrect address of memory. These incorrect reading and writing errors are dangerous because they can lead to software programs with incorrect or inconsistent operation. In certain instances, memory errors can result in security issues as they provide vulnerabilities that are exploitable by third parties.

Memory errors may affect all types of variables in software programs including static memory, stack-based memory, and dynamically allocated memory. The cause of these errors may be at one segment of code while being detected at a second segment of code, making them more difficult to locate and correct. For example, a dynamic memory variable may be deallocated in a first code segment and referenced in a second code segment. A typical software development tool would notify a software developer of this type of memory error by pointing to the second code segment.

As the complexity of software programs increases, the difficulty in diagnosing and correcting memory errors is exacerbated. Software developers may create multiple source code files containing segments of code that are interrelated into a single program. When software development tools, like debuggers or profilers, are utilized to analyze software programs, the tools may point to a segment of code that is not the cause of the error. Further, they may point to a segment of code that is in a completely separate source code file. This misdirection may make debugging software programs more time consuming and difficult.

Additionally, multiple software developers are more often working together creating and debugging increasingly complex software programs. Existing software development tools may be able to detect certain memory errors. These tools, however, may have been created with a single user in mind. Moreover, in a multi-developer software development environment, existing tools may not be able to make decisions about which developer to notify regarding a memory error. Existing software development tools may also notify a single developer or a single group of developers when a memory error occurs. The additional notifications may slow the software development process as developers must read through all development errors.

An advanced memory analysis tracker (tracker) may enable software development tools to more completely identify memory errors and to notify the proper parties responsible for such errors. The tracker may operate within the software development tool or it may operate as a separate program. The tracker may act as a wrapper to the linker of a software development tool. In some embodiments, the tracker may encapsulate the compiler in addition to the linker. The tracker may act additionally as a wrapper of the instrumenter. It is appreciated that regardless of which functionality the advanced memory analysis tracker wraps, the tracker may wrap different pieces of functionality for different software development tools or during different instances of the same tools.

By acting as a wrapper the tracker may take the place and operate as one or more of the compiler, linker, interpreter, and instrumenter. The tracker may act as a wrapper by also providing additional functionality such as recording of any error conditions. The tracker may act as a wrapper by also recording one or more segments of source code or object code. In some embodiments, the tracker may act as a wrapper by receiving data from one component and transmitting data to another component of a software development tool. In these embodiments the tracker may process or alter the data after receiving data but before transmitting the data. In some embodiments, the tracker may act as a wrapper by executing one or more of the software development tools in a step-by-step execution state. During this state the tracker may pause execution of the software development tools, record or alter data, and then resume execution of the software development tools.

The tracker may determine multiple segments of code related to a memory error. An initial memory error located in a first code segment may lead to a memory error in a second code segment. The tracker may utilize object code generated by a compiler to track memory errors. The tracker may utilize intermediate code generated by an interpreter. The tracker may utilize source code generated by one or more software developers to track memory errors. The tracker may capture allocation and deallocation of dynamic memory by wrapping the allocation functions in various code segments. For example, the tracker may wrap the malloc, realloc, calloc, and free functions in code segments written in a C-based language. In some embodiments, the tracker may contain additional functionality normally associated with conventional software development tools such as a compiler, interpreter, instrumenter, or a linker. The tracker may also modify machine code.

The tracker may analyze object code generated from various segments of source code to pinpoint an initial memory error. Then the tracker may use memory registers in the object code as a starting point to locate additional segments of object code that contributed to the memory error. The tracker may trace the output of the compiler and use this output to trace the registers of memory in the object code. The tracker may monitor the operations of the stack and the heap for stack-based and dynamic memory, respectively.

Upon finding one or more segments of code related to a memory error, the tracker may record the segment (or segments) of code. The tracker may additionally record attributes related to the segment of code. The attributes related to the segment of code may be the name of a source code file related to the segment of code. The attributes related to the segment of code may be file descriptive data such as the file creator or the last modifier of a source code file related to the segment of code. In some embodiments of the invention, the attributes may be indirectly related to the segment of code. For example, the attributes may be collected from revision control software or some other software development tool. In this example the attributes may include source code file version information. Yet in other embodiments of the invention, the attributes may be contained within a source code file related to the segment of code (e.g. source code comments identifying a responsible software developer proximate to the segment of source code written by the software developer).

FIG. 1 depicts an example software development environment 100 utilized in some embodiments of the invention. The software development environment 100 comprises the following: one or more client devices 110A, 110B, 110C (herein 110) used by software developers, one or more servers 120 to provide applications and services to the client devices, and a network 130 connecting the client devices and the servers. The client devices 110 and the servers 120 may access one or more instances of a software development tool 140 running on the client devices and the servers. The network 130 may be a local area network or an interconnected set of networks, such as the internet. The network 130 may enable communication between the client devices 110 and servers 120. The network 130 may be wired, wireless, or a combination thereof.

The client devices 110 of the software development environment 100 may each directly access an instance of the software development tool 140. In some embodiments, the client devices may access an instance of the software development tool 140 indirectly. The client devices may enable creation of source code files 150A, 150B, 150C, 150D (herein 150) by one or more software developers. Each software developer may generate one or more source code files 150. The source code files 150 may interrelate to form a single computer program.

The servers 120 may run an instance of the software development tool 140. The servers 120 may provide instances of the software development tool 140 to the client devices 110. In some embodiments, the servers 120 may communicate with a data storage repository (not depicted) to store and retrieve source code files 150 for the software development environment 100. In some embodiments, the client devices 110 run a part of an instance of the software development tool 140 and the servers 120 run another part of the instance.

The software development tool 140 may transform the source code files 150 into one or more object code files. The software development tool 140 may further transform the object code files into an executable that contains instructions to run a computer program. The software development tool 140 may additionally detect errors in the source code files 150, including memory errors. The software development tool may additionally comprise an advanced memory analysis tracker 160 that observes one or both of the source code and the object code. In some embodiments, the advanced memory analysis tracker 160 may run separately from the software development tool 140.

Figure 2:
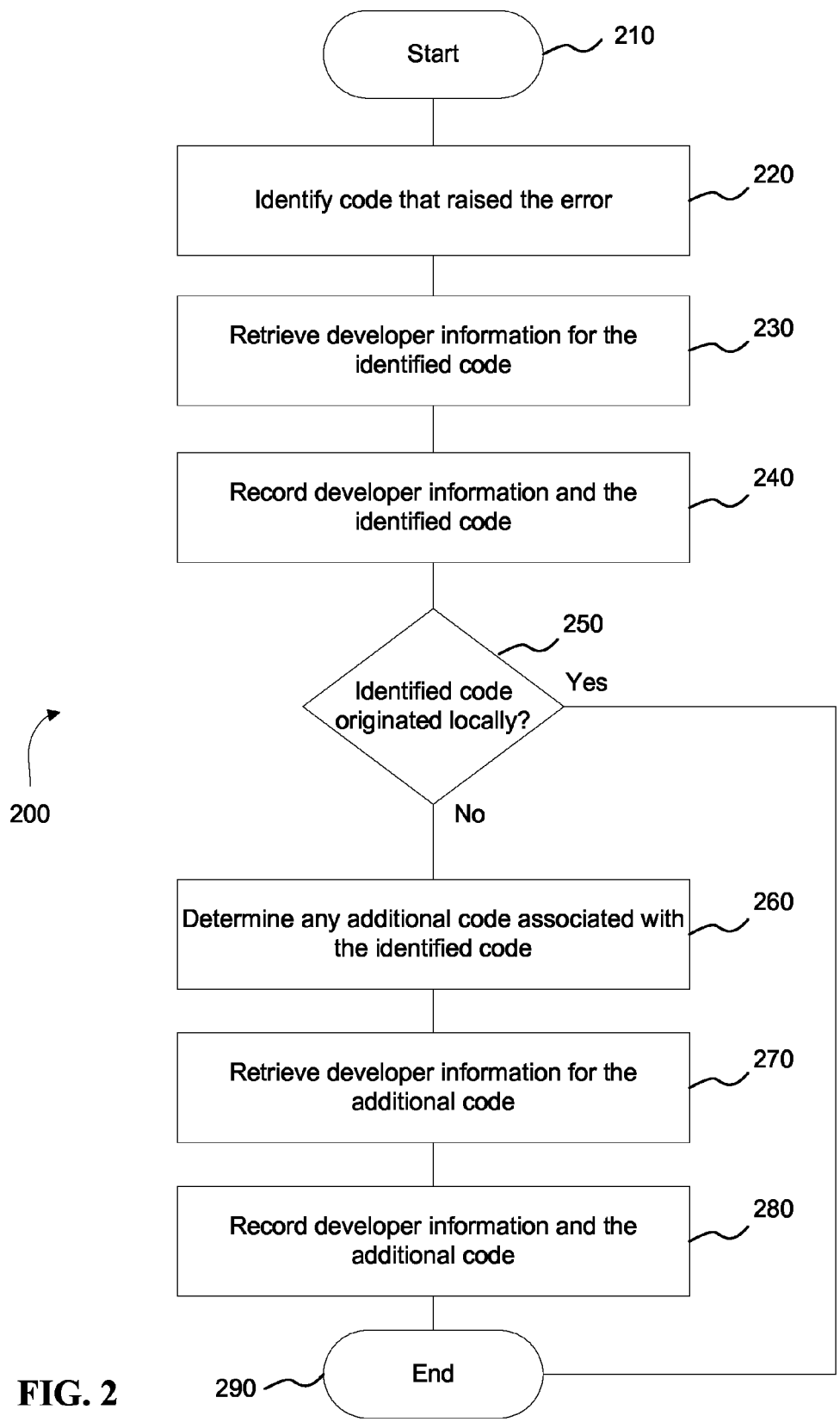
FIG. 2 depicts an example method for determining various segments of code that are related to a memory error within a computer program.

FIG. 2 depicts an example method 200 for determining various segments of code that are related to a memory error within a computer program. Method 200 may generate a list of entries that identify the responsible parties of one or more memory errors. Each entry may contain segments of code related to a memory error and meta-data associating each of the segments of code to a particular software developer. In some embodiments, an advanced memory analysis tracker defined by a different algorithm may be used to generate the list.

From start 210, the tracker identifies, at 220, a first code segment upon detection of an error condition, such as a memory error. In some embodiments of the invention where the tracker is separate from a compiler, instrumenter, and linker, the tracker monitors these software development tools for an error condition. The tracker may store information related to the first code segment, such as its location within a code file (either object code file or source code file). Identification of a first code segment that raises an error may be achieved by monitoring object code and associated errors generated by a compiler that compiles one or more source code files.

Upon identification of a first code segment raising an error condition, the tracker may retrieve related developer information at 230. The tracker may communicate with the software development tool to retrieve related developer information. For example, the tracker may request the name of a developer from the software development tool. The software development tool may read the name of the developer from file attributes of the one or more source code files. At 230 and in some embodiments, the tracker may obtain meta-data indicating a first software developer is responsible for the raised error condition. For example, the tracker may read the name of the developer from the file attributes of the one or more source code files. The tracker may then record, in a file created by the tracker, the first software developer and the first code segment at 240.

At 250, the tracker may determine if the code identified at 220 originated locally (i.e. within the first code segment). If the identified code did not originate locally the tracker may then determine any additional code associated with the identified code at 260. The tracker may determine the origin of code identified at 220 and determine any additional code (at 250 and 260, respectively) by tracing the memory registers in the object code generated by the compiler. In some embodiments, the tracker may determine the origin of code identified at 220 and any additional code (at 250 and 260, respectively) by tracing the variables in the source code to their creation or instantiation. The additional code may be a second code segment related to the raised error condition. In some embodiments, the additional code may be a second instance of the first code segment related to the raised error condition. For example, the first code segment may comprise a recurring code structure with varying stack levels in a memory stack of a computer program.

Next, developer information related to a second software developer may be retrieved at 270. Like retrieving developer information at 230 the tracker may again communicate with the software development tool. The software development tool may read file attributes of a source code file to retrieve information related to a second software developer. In some embodiments of the method 200, the second software developer may be the same as the first software developer. Finally, at 280, the tracker may then record the second software developer and the second code segment. If the identified code did originate locally the tracker may then proceed directly to the end 290.

Figure 3:
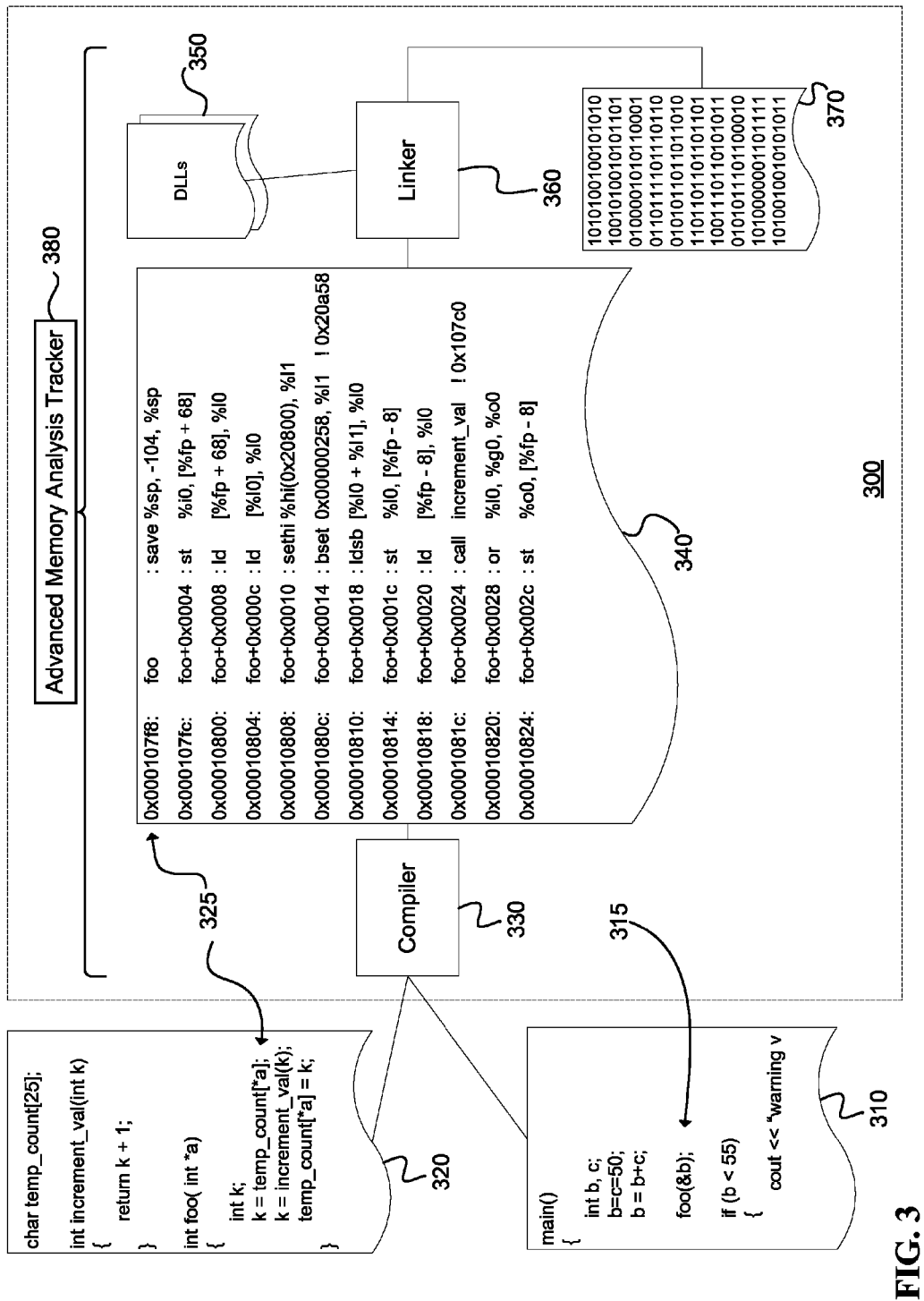
FIG. 3 depicts an example software development tool, consistent with embodiments of the invention.

FIG. 3 depicts an example software development tool 300, consistent with embodiments of the invention. The software development tool 300 comprises a compiler 330 for generating object code from source code; a linker 360 for linking object code into executable code; and an advanced memory analysis tracker 380 that monitors the compiler, any object code, the linker, and any executable code. It is appreciated that the software development tool 300 may comprise different components and that a software development tool in accordance with the invention could be configured or operate differently.

The software development tool 300 may receive multiple source code files from software developers including a first code segment 310 and a second code segment 320. The first code segment 310 is related to a first software developer and the second code segment 320 is related to a second software developer. The first code segment 310 may have developer credentials relating the first code segment to the first software developer. The developer credentials may be an identification number assigned to the first software developer by revision control software (not depicted). In turn, the second code segment 320 may have developer credentials relating the second code segment to the second software developer. The software development tool 300 may retain the developer credentials during operation. In some embodiments, the advanced memory analysis tracker 380 retains the developer credentials.

The software development tool may pass the source code files to the compiler 330. The compiler may generate object code from the source code files. The compiler 330 may further detect and raise an error condition. In some embodiments the linker 360 may detect and raise an error condition. The advanced memory analysis tracker 380 may monitor and record the work of the compiler 330. For example, the compiler 330 has obtained the first code segment 310 and the second code segment 320 from the software development tool 300. Next, the compiler generates object code file 340 by compiling the first code segment 310. The compiler continues to generate object code by compiling the second code segment 320. Upon compiling the second code segment 320, the compiler raises a memory error—the sixth line of code 325 "k=temp_count[*a];" reads beyond the upper bounds of the array. The advanced memory analysis tracker 380 records the object code file 340 of the compiler 330 as well as the array bounds read error and the sixth line of code. The advanced memory analysis tracker 380 also records the origin of the sixth line of code, which is the second code segment 320. The advanced memory analysis tracker 380 also retrieves and records the name of the creator of the second code segment 320, which is the second software developer.

The linker 360 may receive object code from the compiler 330 and generate a computer program in the form of executable code. The linker 360 may also incorporate libraries based upon library calls in the source code. The advanced memory analysis tracker 380 may monitor and record the work of the linker 360. For example, object code file 340 relates to the second code segment 320. Another object code file (not depicted but also generated by the compiler 330) relates to the first code segment 310. The linker 360 takes the object code files and incorporates dynamic link libraries (DLLs) 350 into executable 370. The linker 360 uses the memory registers generated by the compiler 330 to create the executable 370. The advanced memory analysis tracker 380 records the processes of the linker 360 as the linker combines the object code from the first code segment 310 and the second code segment 320 with the DLLs 350.

The advanced memory analysis tracker 380 may analyze the object code of the first code segment 310 and the second code segment 320 to find additional memory errors. For example, the advanced memory analysis tracker 380 traces the memory registers in the object code file 340 from the sixth line of code 325 to the first code segment 310. The advanced memory analysis tracker 380 traces the stack-based memory as the second code segment 320 was called by the first code segment 310—the fifth line of code 315 "foo(&b);" is a function call to the second code segment 320. The advanced memory analysis tracker 380 records the origin of the fifth line of code 315, the first code segment 310. The advanced memory analysis tracker 380 also retrieves and records the name of the creator of the first code segment 310, the first software developer.

Figure 4:
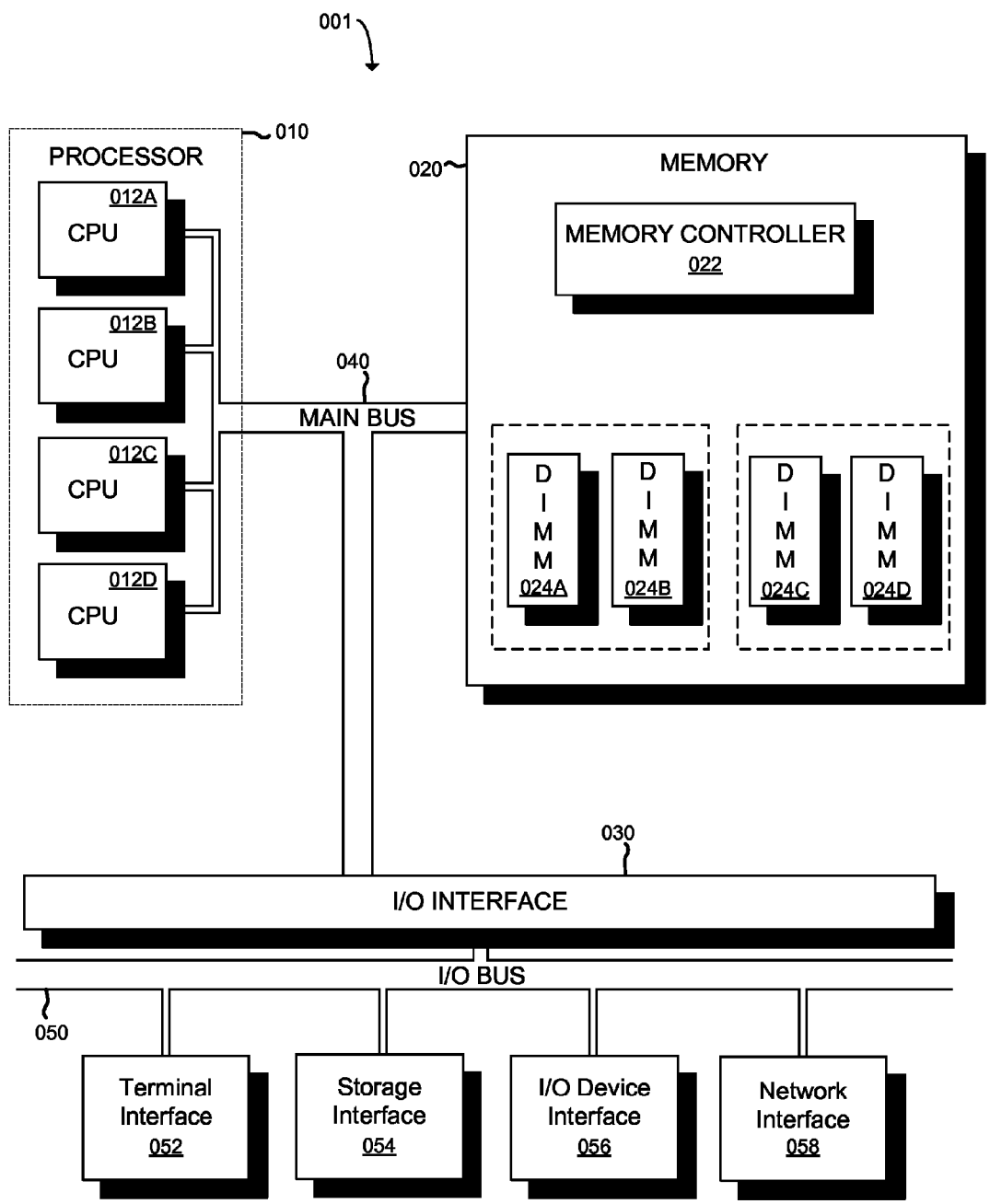
FIG. 4 depicts a high-level block diagram of an example system for implementing one or more embodiments of the invention.

FIG. 4 depicts the representative major components of an exemplary computer system 001 that may be used, in accordance with embodiments of the invention. It is appreciated that individual components may have greater complexity than represented in FIG. 4, components other than or in addition to those shown in FIG. 4 may be present, and the number, type, and configuration of such components may vary. Several particular examples of such complexities or additional variations are disclosed herein. The particular examples disclosed are for exemplar purposes only and are not necessarily the only such variations. The computer system 001 may comprise a processor 010, memory 020, an input/output interface (herein I/O or I/O interface) 030, and a main bus 040. The main bus 040 may provide communication pathways for the other components of the computer system 001. In some embodiments, the main bus 040 may connect to other components such as a specialized digital signal processor (not depicted).

The processor 010 of the computer system 001 may be comprised of one or more CPUs 012A, 012B, 012C, 012D (herein 012). The processor 010 may additionally be comprised of one or more memory buffers or caches (not depicted) that provide temporary storage of instructions and data for the CPUs 012. The CPUs 012 may perform instructions on input provided from the caches or from the memory 020 and output the result to caches or the memory. In some embodiments, the computer system 001 may contain multiple processors 010 typical of a relatively large system; however, in other embodiments the computer system may alternatively be a single processor with a singular CPU 012.

The memory 020 of the computer system 001 may be comprised of a memory controller 022 and one or more memory modules 024A, 024B, 024C, 024D (herein 024). In some embodiments, the memory 020 may comprise a random-access semiconductor memory, storage device, or storage medium (either volatile or non-volatile) for storing data and programs. The memory controller 022 may communicate with the processor 010 facilitating storage and retrieval of information in the memory modules 024. The memory controller 022 may communicate with the I/O interface 030 facilitating storage and retrieval of input or output in the memory modules 024. In some embodiments, the memory modules 024 may be dual in-line memory modules or DIMMs.

The I/O interface 030 may comprise an I/O bus 050, a terminal interface 052, a storage interface 054, an I/O device interface 056, and a network interface 058. The I/O interface 030 may connect the main bus 040 to the I/O bus 050. The I/O interface 030 may direct instructions and data from the processor 010 and memory 030 to the various interfaces of the I/O bus 050. The I/O interface 030 may also direct instructions and data from the various interfaces of the I/O bus 050 to the processor 010 and memory 030. The various interfaces may comprise the terminal interface 052, the storage interface 054, the I/O device interface 056, and the network interface 058. In some embodiments, the various interfaces may comprise a subset of the aforementioned interfaces (e.g., an embedded computer system in an industrial application may not include the terminal interface 052 and the storage interface 054).

Logic modules throughout the computer system 001—including but not limited to the memory 020, the processor 010, and the I/O interface 030—may communicate failures and changes to one or more components to a hypervisor or operating system (not depicted). The hypervisor or the operating system may be allocate the various resources available in the computer system 001 and track the location of data in memory 020 and of processes assigned to various CPUs 012. In embodiments that combine or rearrange elements, aspects of the logic modules capabilities may be combined or redistributed. These variations would be apparent to one skilled in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for identifying code segments in a software development environment, the software development environment associated with a plurality of software developers, the method comprising:
   detecting, by a software development tool and concurrently with compilation, a first code segment that generates a memory error, the first code segment associated with a first software developer;
   associating concurrently with compilation the first software developer with the memory error;
   identifying, by the software development tool and concurrently with compilation, a second code segment, the second code segment related to the first code segment, the second code segment associated with a second software developer; and
   associating concurrently with compilation the second software developer with the memory error.

2. The method of claim 1, wherein the first software developer is the same as the second software developer.

3. The method of claim 1, further comprising:
   generating a notification that identifies the memory error, the first code segment, the first software developer, the second code segment, and the second software developer; and
   sending the notification to a list of recipients, the list of recipients including the first software developer and the second software developer.

4. The method of claim 1, further comprising generating a report that identifies the memory error, the first code segment, the first software developer, the second code segment, and the second software developer.

5. The method of claim 1, wherein the identifying the second code segment comprises:
   locating a stack frame, the stack frame associated with an automatic variable referenced in the first code segment; and
   mapping the stack frame to the second code segment, the second code segment associated with the automatic variable.

6. The method of claim 1, wherein the identifying the second code segment comprises retrieving the location of a static variable in the second code segment.

7. The method of claim 1, wherein the identifying the second code segment comprises:
   wrapping allocation of one or more dynamic memory calls from the second code segment; and
   tracking the dynamic memory calls from the second code segment that call the first code segment.

8. The method of claim 1, wherein the identifying the second code segment comprises analyzing the registers of object code generated from compilation of the code segments.

9. The method of claim 1, wherein the associating the first software developer with the memory error comprises recording file creator attributes of a first source code file, the first source code file containing the first code segment, and wherein associating the second software developer with the memory error comprises recording file creator attributes of a second source code file, the second source code file containing the second code segment.

10. The method of claim 1, wherein the associating the first software developer with the memory error and the associating the second software developer with the memory error comprises scanning a repository, the repository containing entries of software developers and code segments, the entries also containing names that correspond to software developers whom have modified the files.

\* \* \* \* \*